United States Patent Office 3,276,892
Patented Oct. 4, 1966

3,276,892
COMPOSITE NORMAL LEAD CHROMATE-SILICA PIGMENT
Adrian R. Pitrot, Uniondale, N.Y., assignor to National Lead Company, New York, N.Y., a corporation of New Jersey
No Drawing. Filed July 31, 1963, Ser. No. 298,931
8 Claims. (Cl. 106—288)

This invention relates to improved lead chromate pigments commercially known as chrome yellow. In particular, this invention relates to composite normal lead chromate pigments and to a process for preparing the same.

Chrome yellow has long been considered a pigment having excellent properties such as good tinting strength, high covering power and a desirable yellow color suitable for use, for example, in a finish coat traffic paint. Notwithstanding these desirable properties, extensive utilization of this pigment has been curtailed in view of its prohibitive costs and consequently it is rarely utilized as the sole pigment in a paint system but is generally diluted with non-pigmentary filler materials such as clay, silica, chalk or the like. It has been found that dilution with non-pigmentary or extender pigments acts to reduce the intense color imparted to the paint by the lead chromate and, in addition, much of the valuable properties such as light stability and color retention are forsaken. Further, the presence of white and extender pigments result in a washed out effect under prolonged weathering thereby materially diminishing the color imparted by the lead chromate.

It has been found that these disadvantages can be overcome by more efficient utilization of the lead chromate inasmuch as in a particle consisting essentially of normal lead chromate, only the surface of each particle is utilized in coloring, the core of the particle contributing little or nothing to the color of the particle and consequently little or nothing to the color of paint films, plastics, rubber, etc.

An object of this invention therefore, is to provide a coated lead chromate pigment. Another object is to provide a silica-cored lead chromate pigment. Another object is to provide a pigment containing a substantial proportion of silica without the normal deleterious effects of such silica on the pigment properties. A further object is to provide an economical lead chromate pigment of good quality. A yet further object is to provide a process for the manufacture of a silica-cored lead chromate pigment. Another object is to provide an economical yellow traffic paint having improved resistance to automobile exhausts and abrasion resistance. Other objects and advantages will become apparent from the following more complete description and claims.

Broadly, this invention contemplates a new composition of matter comprising a silica particle coated with normal lead chromate. This invention also contemplates a pigmentary composition comprising particles of silica coated with normal lead chromate. This invention also contemplates a paint composition comprising as pigment therefor, silica particles coated with normal lead chromate. This invention further contemplates a process for the manufacture of normal chromate coated silica particles which comprises the steps of forming an aqueous slurry of silica particles, said particles having an average diameter of from 1 to 44 microns, mixing lead monoxide with said slurry, adding chromic trioxide to said silica and lead monoxide slurry, said chromic trioxide added in amount at least 1 mole of $CrO_3$ for each mole of PbO in said slurry, filtering, drying and calcining the product of the reaction at a temperature of from 300° C. to 650° C.

The new compositions of matter contemplated by this invention comprise particles of silica having a coating thereon of normal lead chromate. The proportion of silica to normal lead chromate coating may vary from 25% to 75% silica based on the total weight of the composite particle. Composite particles containing greater than 75% silica show limited coloring effectiveness because of insufficient coating of the particle. Likewise, particles containing less than 25% silica yield products that are more expensive without a compensating increase in effectiveness. For paint or other pigmentary applications, it is preferred to have from about 30% to 60% lead chromate coating.

The normal lead chromate coating referred to in this invention is commercially known as medium chrome yellow. The lead chromate comprises equal moles of lead monoxide and chromic trioxide, namely 1 mole of PbO for each mole of $CrO_3$. The coating may additionally contain lead sulfate, aluminum phosphate or other additives which are capable of varying the color and hue of the pigment. The color and hue of the silica cored lead chromate pigment may be adjusted to meet a variety of requirements. For example, a pigment low in lead chromate will produce a beige or less intense yellow. Lemon or primrose yellows can be produced by adding lead sulfate or aluminum phosphate as part of the coating. To provide the desired pigments, the relative proportions of silica, normal lead chromate and the additives should be within the following ranges based on the total weight of the composition:

|  | Percent |
| --- | --- |
| $SiO_2$ | 25–75 |
| $PbCrO_4$ | 75–25 |
| Additives: |  |
| $PbSO_4$ | 0–40 |
| $AlPO_4$ | 0–5 |

In addition, additives other than those specifically mentioned may be included as part of the lead chromate coating so as to provide other desirable yellows within the spirit of this invention.

The compositions contemplated by this invention are prepared by precipitating lead chromate onto the surface of finely-divided silica and thereafter calcining the coated product. The silica may be any finely-divided silica having an average particle size of from about 1 to 44 microns in diameter, preferably 5 to 10 microns, and may be prepared by precipitation from a silicate solution, by ignition of organo silica compounds, by combustion of volatile compounds such as $SiCl_4$, or in other ways which will be obvious to those skilled in the art. Preferably, finely-divided native silica is employed.

To obtain the finely-divided silica having a particle size of from about 1 to 44 microns the silica is preferably ground in a ball mill. It is believed that the grinding activates the surface of the silica making it receptive to coating by the precipitating particles of lead chromate. The length of time for the grinding will vary according to the particular conditions and means employed. There is ordinarily no advantage in employing a grinding time of more than 24 hours. It is preferred, however, to employ a grinding time of about 16 to 20 hours, as this has produced exceptional results.

After the silica has been prepared in a finely-divided condition, lead monoxide (PbO) and the finely-divided silica are mixed in an aqueous slurry. Thereafter, chromic trioxide is slowly added to the slurry over a period ranging from 1 to 4 hours and preferably from 2 to 3 hours so as to precipitate normal lead chromate onto the active silica surface. Slow addition of the chromic trioxide is preferred because higher percentage and more complete coatings are realized. In addition, it is generally preferable to add a small amount of a so-called solution catalyst, such as acetic acid or any acid capable of forming a soluble lead salt, for the purpose of accelerating the formation of normal lead chromate.

As a source of the chromate ingredient, it is preferred to use chromic trioxide which is readily available, but other chromate materials such as ammonium chromate, sodium chromate, sodium dichromate, potassium dichromate, etc., may be employed. Where the composite product contemplates not only a lead chromate coating but also an additive such as lead sulfate, sulfuric acid may be added to a chromic trioxide solution or to the lead oxide-silica slurry directly.

After the completion of the reaction, the slurry containing normal lead chromate coated silica is filtered and dried. The product is then calcined at a temperature ranging from 300 to 650° C. for a period of from one half to 2 hours. The temperature range of calcination provides a means for controlling the tone or color of the final product which can be varied from a light yellow to orange yellow. It is believed that the calcination further secures a physico-chemical bond between the lead chromate coating and the surface of the silica.

The composite pigment herein contemplated has an average particle size of from about 1–44 microns, and preferably an average particle size of 5 to 12 microns. In a highly preferred embodiment, at least 70% of the particles have an average diameter of less than 10 microns.

The colored composite pigments of this invention possess good light stability which can be attributed to the lead chromate coating. X-ray diffraction studies of the composite pigments indicate the absence of detectable amounts of light sensitive lead silicate thereby rendering unnecessary the use of light stabilizers for lead silicate in film forming formulations.

In order to more fully illustrate the nature of this invention and the manner of practicing the same, the following examples are presented.

*Example I*

3415 grams of silica were ground in a 4 gallon porcelain mill with 2135 ml. of water and 20 pounds of pebbles for 16 hours. The charge was transferred to a jar equipped with an agitator, 2379.5 grams of lead monoxide (PbO) were added and the slurry diluted to a total volume of 17,000 ml. This slurry was agitated for one hour, 11.7 grams of acetic acid was added and 1067.2 grams of chromic trioxide previously dissolved in 5,500 ml. of water were added over a period of 2 hours. The slurry was then filtered and dried in an oven at a temperature of 95° C. to remove surplus water. Portions of the dried product were calcined at a range of temperatures for 2 hours. Table I lists the calculated composition of the silica cored product and the resulting color after calcination.

*Example II*

3415 grams of silica were ground in a 4 gallon porcelain mill with 8,500 ml. of water and 20 pounds of pebbles for 16 hours. The charge was transferred to a jar equipped with an agitator, 793.2 grams of lead monoxide (PbO) were added and the slurry diluted to a total volume of 8,500 ml. This slurry was agitated for one hour, 3.9 grams of acetic acid were added and 355.7 grams of chromic trioxide previously dissolved in 1,830 ml. of water were added over a period of 2 hours. The slurry was then filtered and dried in an oven at a temperature of 95° C. to remove surplus water. Portions of the dried product were calcined at a range of temperatures for 2 hours. Table I lists the calculated composition of the silica cored product and the resulting color after calcination.

*Example III*

1,138 grams of silica were ground in a 4 gallon porcelain mill with 712 ml. of water and 20 pounds of pebbles for 16 hours. The charge was transferred to a jar equipped with an agitator, 2379.5 grams of lead monoxide (PbO) were added and the slurry diluted to a total volume of 17,000 ml. This slurry was agitated for one hour, 11.7 grams of acetic acid added and 1067.2 grams of chromic trioxide previously dissolved in 5,500 ml. of water were added over a period of 2 hours. The slurry was then filtered and dried in an oven at a temperature of 95° C. to remove surplus water. Portions of the dried product were calcined at a range of temperatures for 2 hours. Table I lists the calculated composition of the silica cored product and the resulting color after calcination.

*Example IV*

The procedure of Example I was repeated except that 2411.7 grams of lead monoxide and 853 grams of chromic trioxide were used. In addition, 222.9 grams (100%) sulfuric acid were added to the chromic trioxide solution. Table I lists the calculated composition of the silica cored product and the resulting color after calcination.

*Example V*

The procedure of Example II was repeated except that 814.3 grams of lead monoxide and 213.3 grams of chromic trioxide were used. In addition 148.6 grams (100%) sulfuric acid were added to the chromic trioxide solution. Table I lists the calculated composition of the silica cored product and the resulting color after calcination.

*Example VI*

The procedure of Example III was repeated except that 2401.2 grams of lead monoxide and 924 grams of chromic trioxide were used. In addition 148.6 grams (100%) sulfuric acid were added to the chromic trioxide solution. Table I lists the calculated composition of the silica cored product and the resulting color after calcination.

TABLE I

| Exp. | Percent $PbCrO_4$ | Percent Silica | Percent $PbSO_4$ | Temp. (° C.) of Calcination | Color |
|---|---|---|---|---|---|
| I | 50 | 50 | 0 | 300 | Bright Yellow. |
| I | 50 | 50 | 0 | 400 | Do. |
| I | 50 | 50 | 0 | 500 | Sl. Orange Yellow. |
| I | 50 | 50 | 0 | 650 | Orange Yellow. |
| II | 25 | 75 | 0 | 300 | Yellow. |
| II | 25 | 75 | 0 | 400 | Do. |
| II | 25 | 75 | 0 | 500 | Sl. Orange Yellow. |
| II | 25 | 75 | 0 | 650 | Orange Yellow. |
| III | 75 | 25 | 0 | 300 | Bright Yellow. |
| III | 75 | 25 | 0 | 400 | Do. |
| III | 75 | 25 | 0 | 500 | Sl. Orange Yellow. |
| III | 75 | 25 | 0 | 650 | Orange Yellow. |
| IV | 40 | 50 | 10 | 300 | Bright Yellow. |
| IV | 40 | 50 | 10 | 400 | Do. |
| IV | 40 | 50 | 10 | 500 | Yellow. |
| IV | 40 | 50 | 10 | 650 | Sl. Orange Yellow. |
| V | 15 | 75 | 10 | 300 | Light Yellow. |
| V | 15 | 75 | 10 | 400 | Do. |
| V | 15 | 75 | 10 | 500 | Do. |
| V | 15 | 75 | 10 | 650 | Do. |
| VI | 65 | 25 | 10 | 300 | Yellow. |
| VI | 65 | 25 | 10 | 400 | Do. |
| VI | 65 | 25 | 10 | 500 | Do. |
| VI | 65 | 25 | 10 | 650 | Very Sl. Orange Yellow. |

*Example VII*

3415.5 grams of silica were ground in a 4 gallon pebble mill with 2135 ml. of water and 20 pounds of pebbles for 16 hours. After transferring the silica slurry to a glass cylindrical jar equipped with baffles and an agitator, 3463.1 grams of litharge were bolted wet thru a #100 screen and added to the slurry. This was followed by the addition of approximately 9 liters of water and 8.5 grams of acetic acid. Thereafter, 1545.5 grams of chromic trioxide were dissolved in 2 liters of water and slowly added to the agitated slurry over a period of 4 hours, 22.6 grams of sulfuric acid diluted in 100 ml.

of water were added after 15 minutes. The product was filtered, dried and disintegrated by passing through a Raymond Mill using a 0.030″ screen. The product was then calcined at a temperature of 625° C. for 2 hours, and again disintegrated through a 0.010″ screen. The silica cored product had the following calculated composition:

40.8% PbO, 18.3% $CrO_3$ and 40.8% $SiO_2$

*Example VIII*

A 50% lead chromate coated silica pigment was formulated into traffic paints and compared to a standard lead chromate pigment; all formulations appearing in Table II.

The above control and test paints were evaluated for light stability by painting 1½″ x 1½″ steel panels with a 10 mil wet film thickness and exposing the same in an Atlas FDA–R Fade-Ometer having a continuous carbon arc light and a black panel temperature of 125° F. After 48 hours the panels painted with the control paints began to noticeably darken whereas the test paints containing the silica-cored pigment withstood any noticeable change until the expiration of 108 hours. After 296 hours of continuous exposure, the test paints were only very slightly photo-sensitive and had better color retention than the control paints.

The above paints were also evaluated for light stability by painting 4″ x 8″ buffed steel "Q" panels with a 10 mil wet film thickness and exposing the same in an Atlas XW weatherometer having a twin carbon arc and a black panel temperature of 140° F. The panels were exposed to the continuous light and to a fresh water spray for 18 minutes every two hours. After 397 hours, the test paints showed less color change than the control paints. Similar results were noted after 659 hours.

Traffic paints formulated with normal lead chromate coated silica pigment were exposed to highway traffic by painting selected portions of black top and concrete roads. After six months exposure, good results in abrasion and fume resistance were noted.

said silica present from about 25% to about 75% based on the total weight of the composition.

2. A new composition of matter consisting essentially of a silica particle coated with normal lead chromate and normal lead sulfate, said silica present from about 25% to about 75%, said normal lead chromate present from about 75% to about 25%, said normal lead sulfate present in an amount not exceeding 40%, where all percents are based on the total weight of the composition.

3. A process for the manufacture of normal lead chromate coated silica particles which comprises the steps of forming an aqueous slurry of silica particles, said particles having an average diameter of from 1 to 44 microns, mixing lead monoxide with said slurry, adding chromic trioxide to said silica and lead monoxide slurry, said chromic trioxide added in amount of at least 1 mole of $CrO_3$ for each mole of PbO in said slurry, filtering, drying, and calcining the product of the reaction at a temperature of from 300° C. to 650° C., said silica being present in a quantity to provide normal lead chromate coated silica particles containing silica from about 25% to about 75% by weight.

4. A process for the manufacture of normal lead chromate coated silica particles according to claim 3, wherein said chromic trioxide is added to said silica and lead monoxide slurry over a period ranging from 1 to 4 hours.

5. A process for the manufacture of normal lead chromate coated silica particles according to claim 3, wherein said product is calcined for a period of from one half to 2 hours.

6. A process for the manufacture of normal lead chromate-normal lead sulfate coated silica particles which comprises the steps of forming an aqueous slurry of silica particles, said particles having an average diameter of from 1 to 44 microns, mixing lead monoxide with said slurry, adding chromic trioxide and sulfuric acid to said silica and lead monoxide slurry, said chromic trioxide and sulfuric acid added in amount of at least 1 combined mole of $CrO_3$ and $SO_3$ for each mole of PbO in said slurry, filtering, drying and calcining the product of the reaction at a temperature of from 300° C. to 650° C., said silica being present in a quantity to provide normal lead chromate-normal lead sulfate coated silica particles containing silica from about 25% to about 75% by weight.

7. A process for the manufacture of normal lead chromate-normal lead sulfate coated silica particles ac-

TABLE II

|  | Control 1 | Test 1 | Control 2 | Test 2 | Control 3 | Test 3 |
|---|---|---|---|---|---|---|
| Percent Pigment | 45.6 | 45.3 | 49.9 | 48.7 | 68.6 | 68.3 |
| Pigment Composition, lbs.: |  |  |  |  |  |  |
| Normal-Lead Chromate | 54 |  | 182 |  | 115 |  |
| Normal-Lead Chromate Coated Silica (50% coating) |  | 75 |  | 253 |  | 160 |
| Calcium Carbonate | 375 | 340.3 |  |  | 800 | 733.5 |
| Rutile $TiO_2$ | 21 | 29.4 |  |  | 45 | 50 |
| Magnesium Silicate | 23.5 | 23.5 | 230 | 79.5 | 50 | 50 |
| Extended $TiO_2$ |  |  | 74 | 125 |  |  |
| Mica |  |  | 51 | 51 |  |  |
| Zinc Oxide |  |  | 28 | 28 |  |  |
| Bentone 38 (organophilic bentonite) | 5 | 5 | 5 | 5 | 5 | 5 |
| Percent Vehicle | 54.4 | 54.7 | 50.1 | 51.3 | 31.4 | 31.7 |
| Vehicle Composition, lbs.: |  |  |  |  |  |  |
| Medium Oil Alkyl Resin | 397 | 397 | 397 | 397 | 270 | 270 |
| Mineral Spirits | 165 | 165 | 165 | 165 | 187 | 187 |
| 6% Co Naphthenate | 2 | 2 | 2 | 2 | 1.3 | 1.3 |
| 24% Pb Naphthenate | 4 | 4 | 4 | 4 | 2.7 | 2.7 |
| 95% methanol/5% Water | 1.5 | 1.5 | 1.5 | 1.5 | 1.5 | 1.5 |
| Anti-skinning agent | 1 | 1 | 1 | 1 | 1 | 1 |

While this invention has been described by way of certain preferred embodiments and illustrated by specific examples, these are illustrative only, and the invention is not to be construed as limited except as set forth in the appended claims.

I claim:

1. A new composition of matter consisting essentially of a silica particle coated with normal lead chromate, cording to claim 6 wherein said chromic trioxide and sulfuric acid are added to said silica and lead monoxide slurry over a period ranging from one to four hours.

8. A process for the manufacture of normal lead chromate-normal lead sulfate coated silica particles according to claim 6 wherein said product is calcined for a period of from one half to 2 hours.

References Cited by the Examiner
UNITED STATES PATENTS
3,118,780  1/1964  Dunn et al. _____ 106—298

TOBIAS E. LEVOW, *Primary Examiner.*

J. POER, S. MOTT, *Assistant Examiners.*